United States Patent [19]

Urquhart

[11] 4,301,749
[45] Nov. 24, 1981

[54] FLUIDIZED BED COMBUSTION

[75] Inventor: William M. Urquhart, Renfrew, Scotland

[73] Assignee: Babcock & Wilcox Limited, London, England

[21] Appl. No.: 973,186

[22] Filed: Dec. 26, 1978

[51] Int. Cl.³ .................. F23D 19/00; F23C 5/16
[52] U.S. Cl. .................. 110/261; 110/244; 431/7; 431/170; 432/15; 432/58
[58] Field of Search ............ 431/7, 170; 110/243, 110/244, 261; 432/15, 58

[56] References Cited

U.S. PATENT DOCUMENTS

| | | | |
|---|---|---|---|
| 3,417,978 | 12/1968 | Suzukawa et al. | 431/7 |
| 3,633,887 | 1/1972 | Bechthold et al. | 432/15 |
| 3,727,563 | 4/1973 | Hasselbring et al. | 110/244 X |
| 3,737,283 | 6/1973 | Nikles | 431/170 X |
| 3,804,581 | 4/1974 | Schmalfeld et al. | 432/58 |
| 3,861,862 | 1/1975 | Steever et al. | 432/58 |
| 3,863,577 | 2/1975 | Steever et al. | 432/15 X |
| 3,881,857 | 5/1975 | Hoy et al. | 431/7 |
| 3,914,089 | 10/1975 | Desty et al. | 431/7 |
| 4,085,516 | 4/1978 | Jukkola et al. | 432/15 X |
| 4,165,717 | 8/1979 | Reh et al. | 431/7 X |
| 4,176,623 | 12/1979 | Blaskowski | 110/244 X |

FOREIGN PATENT DOCUMENTS

| | | | |
|---|---|---|---|
| 483392 | 5/1952 | Canada | 432/15 |
| 587774 | 5/1947 | United Kingdom | 432/15 |
| 1339287 | 11/1973 | United Kingdom | 431/170 |
| 1425704 | 2/1976 | United Kingdom | 431/7 |

Primary Examiner—Robert S. Ward, Jr.
Attorney, Agent, or Firm—Kemon & Estabrook

[57] ABSTRACT

Fluidized bed combustors and provision for the operation of such combustors so that the fluidizing medium supplied to one part is at a velocity different from that at which air is supplied to an adjacent part.

2 Claims, 1 Drawing Figure

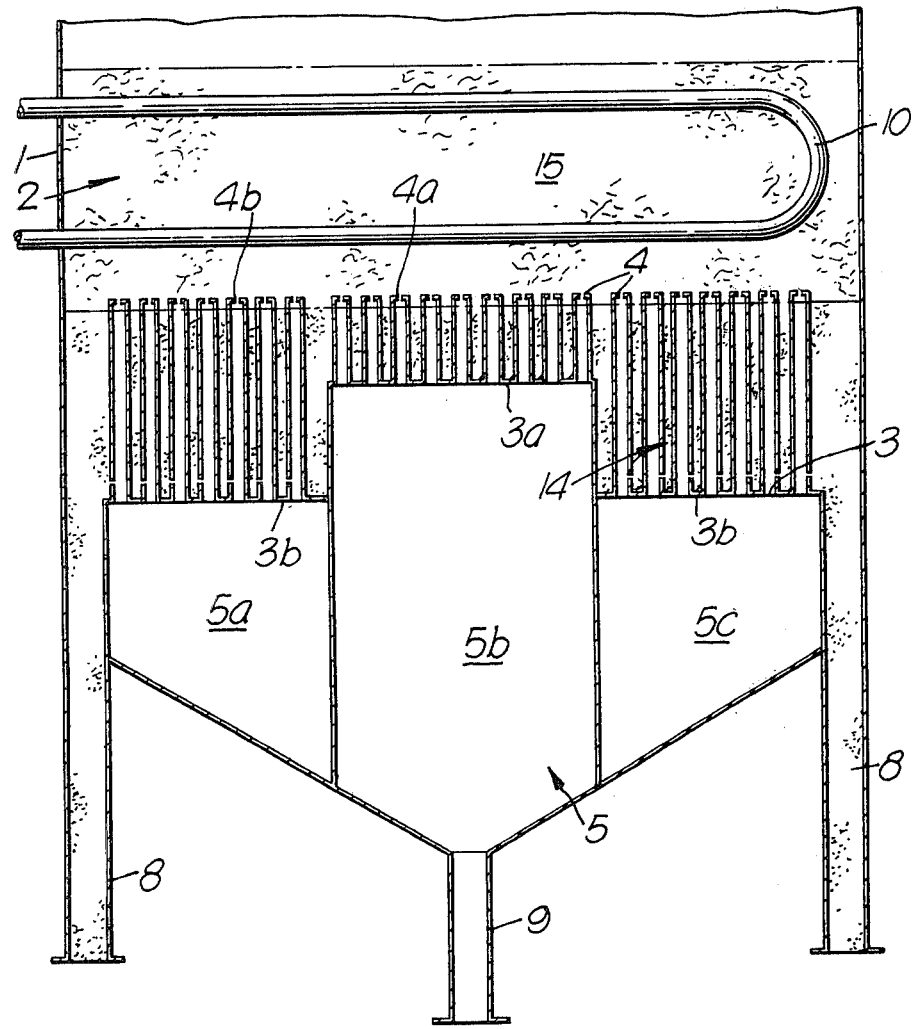

FLUIDIZED BED COMBUSTION

DESCRIPTION

This invention relates to fluidized bed combustors. A problem of previous combustors is that fine combustible, grits tend to be carried out of the bed into the exhaust with a resultant loss in the efficiency with which the fuel is burned and in the extraction of the heat generated by combustion.

According to the present invention, there is provided a fluidized bed combustor having a fluidized bed containing combustible solid material with fluidizing medium being supplied to one part of the bed with a velocity greater than the velocity at which fluidizing medium is supplied to an adjacent part of the bed. The fluidizing medium may be solely air.

By way of example, an embodiment of the invention will now be described with reference to the accompanying drawing which shows, somewhat schematically, in vertical section, the fluidized bed of a fluidized bed combustor in which solid combustible material is burned.

The combustor, 1, provides a combustion chamber 2 of which the floor is provided by a distributor plate 3. The plate has a central portion 3a lying at a level above that of the surrounding portion 3b. Air nozzles 4 extend upwardly from the distributor plate 3; the upper ends of all the nozzles are at the same level so that the nozzles 4a that extend up from the portion 3a are shorter than those that extend up from the portion 3b.

Nozzles 4a have openings for the escape of air only at their upper end whilst nozzles 4b have openings for the escape of air at their upper ends and, also, openings just above the distributor plate 3 through which air can escape at a lower velocity. The dimension and distribution of the openings in the nozzles 4 are such that the air escaping from the nozzles 4a is at a lower velocity than that escaping from the nozzles 4b.

The distributor plate 3 forms the upper boundary of a wind box 5 that is divided into parts, three of which are indicated at 5a, 5b and 5c. As a result of this division, it is possible to fire parts of the bed sequentially. Ash pipes 8 provide means through which ash can drain from the fluidized bed, and ash pipe 9 provides for the escape of ash falling into the wind box 5.

Tubes 10 through which cooling fluid can be passed lie in the fluidized bed above the nozzles 4.

The apparatus that has been described operates in a way that has been described and claimed in my copending application Ser. No. 973,160 filed of even date, so that the bed forms a lower, static, layer 14 and an upper, fluidized, layer 15, the bottom of which lies at the level of the outlets from the upper ends of the nozzles 4. The bed is fired from above. The tubes 10 lies in the upper layer 15. In operation of the bed, larger particles fall into the lower layer 14 and are discharged through the pipes 8.

Also, during operation air escaping from the nozzles 4a is at a lower velocity than air escaping from the nozzles 4b. This encourages circulation of the fuel within the bed which will tend to result in a smaller proportion of combustible grits being carried to the exhaust from the chamber 1. At the same time, grits that reach the outlet can be re-introduced into the area in which the air velocity is less, where the residence time will be such as to promote their complete combustion.

Whilst the embodiment described operates with a bed that forms two layers, it will be realized that the invention can be employed when the bed is not so striated and may be intended to be homogeneous. Where the invention is used with a bed that forms layers, these layers may be uniform depth across the area of the bed.

I claim:

1. A fluidized bed combustor having a fluidized bed containing combustible solid material overlying a lower, static, layer into which material from the fluidized layer falls, means through which material from the lower layer drains from the combustor, fluidizing medium being supplied to one part of the fluidizing bed with a velocity greater than that at which fluidizing medium is supplied to an adjacent part of the bed.

2. A fluidized bed combustor as claimed in claim 1 in which the floor of the bed below the part of the bed to which fluidizing medium is supplied at the greater velocity is lower than the floor of the bed below the part to which fluidizing medium is supplied at the lesser velocity.

* * * * *